(12) United States Patent
McKinney

(10) Patent No.: US 11,441,297 B2
(45) Date of Patent: *Sep. 13, 2022

(54) WASTEWATER RE-USE SYSTEMS

(71) Applicant: Jerry L. McKinney, Silsbee, TX (US)

(72) Inventor: Jerry L. McKinney, Silsbee, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,832

(22) Filed: Apr. 10, 2020

(65) Prior Publication Data

US 2020/0240121 A1 Jul. 30, 2020

Related U.S. Application Data

(63) Continuation of application No. 13/194,525, filed on Jul. 29, 2011, now Pat. No. 10,697,155.

(Continued)

(51) Int. Cl.
*E03B 1/04* (2006.01)
*B01D 21/00* (2006.01)
(Continued)

(52) U.S. Cl.
CPC .......... *E03B 1/041* (2013.01); *B01D 21/0018* (2013.01); *B01D 21/02* (2013.01); *B01D 21/2444* (2013.01); *C02F 3/02* (2013.01); *C02F 2103/002* (2013.01); *C02F 2103/005* (2013.01); *E03B 2001/045* (2013.01); *Y02W 10/10* (2015.05)

(58) Field of Classification Search
CPC ...... E03B 1/041; E03B 2001/045; E03B 1/04; E03B 1/042; E03B 13/00; Y02W 10/10; C02F 2103/002; C02F 2103/005; C02F 3/02; C02F 1/00; C02F 1/001; C02F 1/008; C02F 1/30; C02F 1/32; C02F 1/52; C02F 3/28; C02F 3/30; C02F 3/301; C02F 9/00; C02F 11/00; C02F 11/02; C02F 2001/007; C02F 2203/00; C02F 2307/14; B01D 21/0018; B01D 21/2444; B01D 21/02; B01D 21/0012; B01D 21/24; B01D 21/30; B01D 21/302; B01D 21/34; B01D 36/00; B01D 36/04; E02B 13/00

USPC ......... 210/85, 90, 103, 134, 170.01, 170.06, 210/170.08, 194, 195.1, 257.1, 258, 259, 210/532.1, 532.2; 405/36, 37

See application file for complete search history.

(56) References Cited

U.S. PATENT DOCUMENTS 3,306,447 A * 2/1967 Medeiros .................. C02F 3/30
                                                                210/121
3,875,051 A    4/1975 Kovarik
(Continued)

OTHER PUBLICATIONS

Hoffman, H. et al., Case Study of sustainable sanitation projects: Blackwater and greywater reuse system, Chorrilos, Lima, Peru, published in www.susana.org, Apr. 14, 2009. (Year: 2009).*

(Continued)

*Primary Examiner* — Joseph W Drodge
(74) *Attorney, Agent, or Firm* — Bushman Werner, P.C.

(57) ABSTRACT

A wastewater reuse system has a wastewater treatment system connected to a dwelling for receiving wastewater therefrom. The wastewater treatment system has a pump tank with an outlet that can be connected to a central wastewater collection system and/or a re-use recipient of treated wastewater such as an irrigation system.

4 Claims, 3 Drawing Sheets

Related U.S. Application Data

(60) Provisional application No. 61/375,673, filed on Aug. 20, 2010, provisional application No. 61/368,813, filed on Jul. 29, 2010.

(51) Int. Cl.
*B01D 21/02* (2006.01)
*B01D 21/24* (2006.01)
*C02F 3/02* (2006.01)
*C02F 103/00* (2006.01)

(56) References Cited

U.S. PATENT DOCUMENTS

| | | | |
|---|---|---|---|
| 4,465,594 A * | 8/1984 | Laak | C02F 3/06 210/151 |
| 4,826,601 A | 5/1989 | Spratt et al. | |
| 4,986,905 A * | 1/1991 | White | C02F 3/046 405/51 |
| 5,006,232 A * | 4/1991 | Lidgitt | C02F 3/1242 210/96.1 |
| 5,147,532 A * | 9/1992 | Leek, Jr. | C02F 1/325 210/97 |
| 5,192,426 A * | 3/1993 | DeCoster | E03B 1/04 210/117 |
| 5,403,498 A | 4/1995 | Morrissey et al. | |
| 5,411,631 A * | 5/1995 | Hori | C23F 4/00 134/1 |
| 5,498,330 A | 3/1996 | Delle Cave | |
| 5,647,986 A | 7/1997 | Nawathe et al. | |
| 5,667,670 A * | 9/1997 | Drewery | B01D 24/4631 210/86 |
| 5,670,037 A * | 9/1997 | Zaiting | C10G 11/05 208/114 |
| 5,895,569 A * | 4/1999 | Connelly | E03F 3/02 210/170.08 |
| 6,139,744 A * | 10/2000 | Spears | F23G 7/00 210/614 |
| 6,284,138 B1 * | 9/2001 | Mast | C02F 3/342 210/606 |
| 6,334,958 B1 * | 1/2002 | Ruskin | C02F 3/288 210/138 |
| 6,379,546 B1 * | 4/2002 | Braun | C05F 3/04 210/607 |
| 6,444,126 B1 * | 9/2002 | Gates | C02F 3/006 210/612 |
| 6,562,236 B2 | 5/2003 | Ryiander et al. | |
| 6,652,743 B2 * | 11/2003 | Wallace | C02F 3/06 210/170.01 |
| 6,669,839 B2 | 12/2003 | Tipton et al. | |
| 6,863,805 B1 * | 3/2005 | Barreras, Sr. | B01D 21/0006 210/143 |
| 7,147,771 B2 * | 12/2006 | Turley | C02F 3/12 210/196 |
| 7,149,701 B2 | 12/2006 | McKinney | |
| 7,525,420 B2 | 4/2009 | McKinney | |
| 7,534,070 B1 * | 5/2009 | Urban | E03B 1/04 405/51 |
| 7,846,328 B2 * | 12/2010 | Costa | C02F 3/04 210/194 |
| 8,002,984 B1 * | 8/2011 | Wanielista | B01J 20/24 210/602 |
| 8,066,887 B1 * | 11/2011 | Culler | C02F 9/00 210/739 |
| 8,191,307 B2 | 6/2012 | Donoghue et al. | |
| 8,246,829 B2 * | 8/2012 | O'Regan, Jr. | C02F 3/006 210/605 |
| 9,217,108 B2 * | 12/2015 | Wallace | A01G 25/00 |
| 9,662,613 B2 * | 5/2017 | Wallace | B01D 61/025 |
| 10,308,536 B1 * | 6/2019 | Lowe | C02F 3/121 |
| 10,623,473 B2 * | 4/2020 | McKinney | C02F 1/008 |
| 10,697,155 B2 * | 6/2020 | McKinney | E03B 1/041 |
| 10,737,956 B1 * | 8/2020 | Parisien | C02F 1/484 |
| 10,763,021 B1 * | 9/2020 | Parisien | C02F 1/487 |
| 10,875,794 B1 * | 12/2020 | Parisien | C02F 1/487 |
| 10,934,186 B1 * | 3/2021 | Parisien | H01F 7/20 |
| 2003/0024874 A1 * | 2/2003 | Wallace | C02F 3/306 210/602 |
| 2004/0230455 A1 | 11/2004 | McKinney | |
| 2005/0021359 A1 | 1/2005 | McKinney | |
| 2006/0293797 A1 * | 12/2006 | Weiler | A01G 25/165 700/284 |
| 2007/0021971 A1 | 1/2007 | McKinney et al. | |
| 2007/0106525 A1 | 5/2007 | McKinney | |
| 2007/0106527 A1 | 5/2007 | McKinney | |
| 2008/0087749 A1 * | 4/2008 | Ruskin | A01G 25/165 239/542 |
| 2008/0288116 A1 | 11/2008 | Nickerson | |
| 2008/0314828 A1 | 12/2008 | Campbell | |
| 2009/0014383 A1 | 1/2009 | Owley | |
| 2009/0026132 A1 | 1/2009 | Costa | |
| 2009/0065412 A1 * | 3/2009 | Mbarki | C02F 3/04 210/151 |
| 2009/0294356 A1 * | 12/2009 | Beggs | B01D 24/4631 210/618 |
| 2010/0155328 A1 * | 6/2010 | O'Regan, Jr. | C02F 3/30 210/614 |
| 2010/0300544 A1 | 12/2010 | Baldwin et al. | |
| 2011/0017678 A1 * | 1/2011 | Anderson | C02F 1/008 210/739 |
| 2011/0088315 A1 | 4/2011 | Donoghue | |
| 2011/0278220 A1 * | 11/2011 | Lowe | C02F 3/006 210/617 |
| 2011/0308618 A1 * | 12/2011 | Lorenz | E03B 1/042 137/1 |
| 2012/0228117 A1 * | 9/2012 | Panunzio | C02F 9/00 203/10 |
| 2014/0044485 A1 * | 2/2014 | Wallace | B01D 61/025 405/36 |
| 2015/0100169 A1 * | 4/2015 | McKinney | H04L 67/10 700/284 |
| 2019/0150377 A1 * | 5/2019 | Zhang | A01G 7/06 |
| 2020/0240121 A1 * | 7/2020 | McKinney | E03B 1/041 |

OTHER PUBLICATIONS

Jennifer Burney et al., "Solar-power drip irrigation enhances food security in the Sudano-Sahel", published in PNAS, vol. 7, No. 5, Feb. 2, 2010, pp. 1848-1853. (Year: 2010).*

* cited by examiner

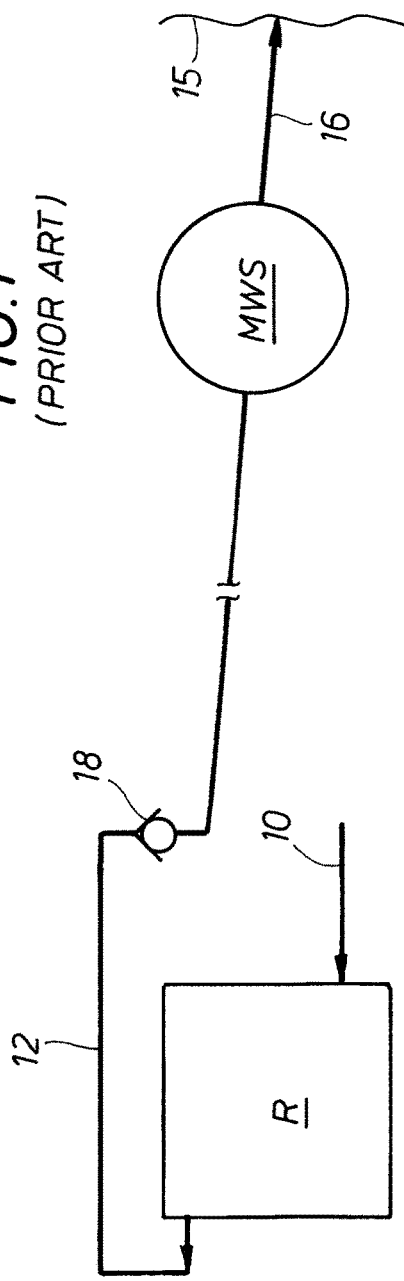
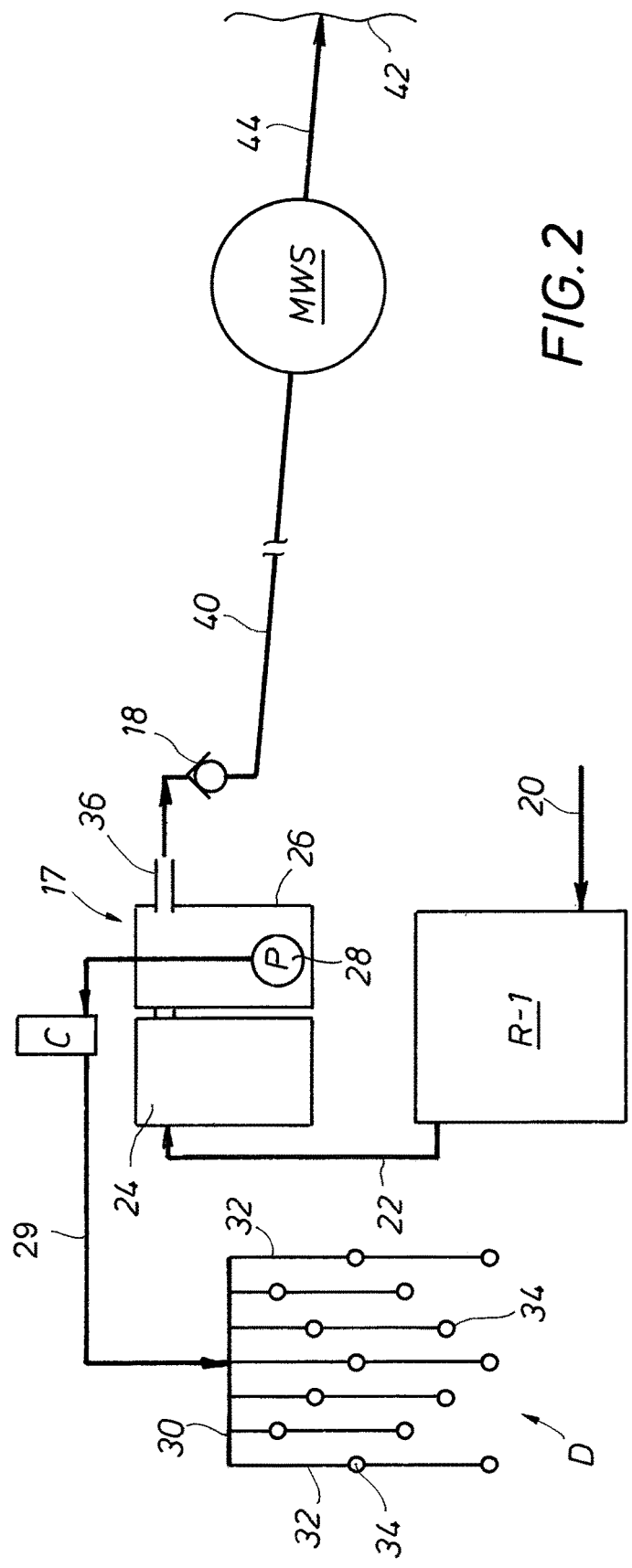

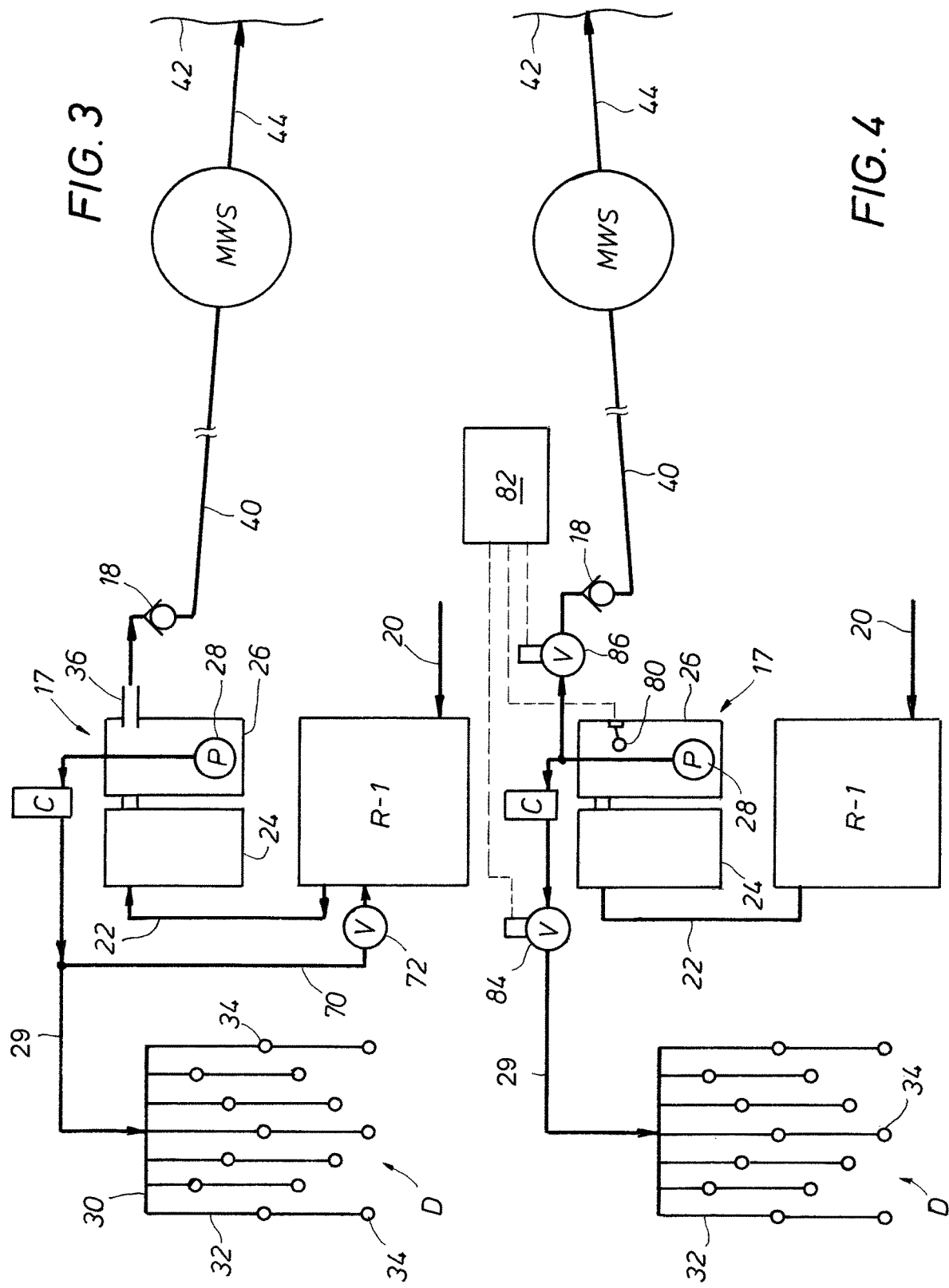

WASTEWATER RE-USE SYSTEMS

CROSS REFERENCE TO RELATED APPLICATION

This application is a continuation of U.S. application Ser. No. 13/194,525, filed on Jul. 29, 2011, which in turn claims priority to US Application Nos. 61/368,813 filed on Jul. 29, 2010, and 61/375,673 filed on Aug. 20, 2010, the disclosures of which are incorporated herein by reference for all purposes.

BACKGROUND OF THE INVENTION

Field of the Invention

The present invention relates to re-use of wastewater and, more particularly, to re-use of wastewater from wastewater treatment systems; e.g., septic systems, aerobic and other advanced wastewater treatment systems, and the like, for irrigation/sprinkler systems on yards, greenbelts, etc.

Background of the Invention

In general, there are three basis ways that wastewater from a wastewater generating source; e.g., home, business or the like can be disposed of, namely;

(1) direct connection to a municipal wastewater treatment system (MWS);

(2) use of a septic system (SSS); and (3) use of an advanced or secondary wastewater treatment system (AWTS); e.g., an aerobic wastewater treatment system.

For purposes of the following description and claims, the SSS and AWTS are sometimes referred to as a "wastewater treatment system."

For purposes of the following description, while the words homes, residences or dwellings may be employed, it will be understood that the words include commercial establishments, restaurants and the like.

MWS

Residences located in cities, for the most part, use system (1) above; i.e., direct connection to an MWS. As cities grow in population and/or expand geographically, the number of users of the MWS increases, sometimes to the point where the MWS becomes overloaded, which in certain cases is addressed by adding more capacity to existing MWS or building more MWS. Perhaps more important, in cases where, particularly in the present economic climate, cities and other municipalities do not have the funds to increase the size and/or number of MWS, it is not infrequent that inadequately treated wastewater is released into streams; e.g., rivers, creeks, bayous, etc., leading to severe environmental problems. Indeed, even under the best of circumstances, treated wastewater from MWS is now routinely discharged into such streams and, even though it has gone through a treatment process, it is generally not free of residual bacteria.

Another problem with the use of an MWS as the sole means of treating residential wastewater is that increasingly scarce, fresh water is wasted. This can be a particular problem in municipalities in climates where annual rainfall is meager and municipal, potable water for homeowners comes from lakes, streams, underground aquafiers, etc. Indeed, in such arid climates, conservation of fresh water is of the utmost importance because of its scarcity.

Overall, the use of MWS is costly, typically has environmental impact and contributes to waste of potable water.

SSS

In the second method of disposing of wastewater, i.e., an SSS, the wastewater typically flows from the home to a pretreatment/settling tank, where solids settle, clarified water passing to a pump tank or other such holding tank from which it is discharged either to a drain field, sprinkler system, or to streams, etc. While an SSS solves the problem of overloading the MWS, and does minimize the use of potable water resources, if the treated wastewater is used for irrigation, it is subject to upsets caused by heavy rain and/or periodic over capacity usage.

An SSS system also suffers from the disadvantage that the treated water therefrom may pass to a drain field or the like, which because of soil conditions, does not allow for the absorption of all the wastewater. Additionally, if an SSS fails for some reason, typically there is no backup. As a result, sewage or wastewater can spill onto land, backup into the residence, etc. If the soil in the drain field employed with the SSS becomes saturated with organic material, and again depending upon soil conditions, the treated water from the SSS will not be sufficiently absorbed, and because there is no backup system, an environmental problem can be posed.

AWTS

While with respect to AWTS for disposal of wastewater, the present invention will be described in one embodiment with reference to an aerobic wastewater treatment system (ATS), it is to be understood that other types of advanced wastewater treatment systems, as for example, evaporation-transpiration (ET) septic systems, septic media filters, mound septics, raised beds septics, pressure dosing septic systems, sand bed filters, peat beds, etc., can be used.

In an ATS, the wastewater from the home or the like flows to a pretreatment/settling tank, clarified water passing from the settling tank into an aerobic treatment tank, where most remaining solids in the clarified water from the settling tank are digested by means of aerobic activity, the aerobically treated, clarified wastewater then passing to a pump tank or other holding tank for discharge to a drain field, sprinklers, and/or streams. An ATS has advantages over an SSS in that, treated wastewater can be more easily disinfected which, if done, results in a wastewater having a low bacteria count, thus making it safer when being discharged into streams. However, an ATS is subject to some of the same disadvantages experienced by the SSS as to poor soil conditions in the irrigation field, extreme rainfall and no fail-proof backup system. Like an SSS, it also conserves fresh water if the treated wastewater is used for irrigation.

In the case of either the SSS or the AWTS, when the water discharged from either of those systems goes to a drain field, for irrigation or the like, there must be enough available land; e.g., yard, greenbelt, etc., to handle all the treated water.

Commonly, to supply fresh or potable water to residences, businesses, houses, etc., in or near cities, towns or other such relatively densely populated areas, raw water from a source; e.g., a river, reservoir, etc., is treated; e.g., chlorinated, so as to be substantially free of any bacteria harmful to humans. However, generally in all cases some of the potable water being supplied, is used for irrigation purposes on lawns, greenbelts, shrubs, etc. The production of potable water from rivers and other such sources is expensive, both in terms of the initial treatment of the raw water and in the delivery via pumping stations, pipelines, etc.

What is needed is a system for treatment and re-use of wastewater, primarily residential wastewater, which can reduce the loading on MWS, especially as population grows and/or, new subdivisions are built, etc., reduces the use of potable water by residences, allows re-use of treated wastewater and, reduces environmental impact, particularly in the case of the pollution of streams, particularly streams running close or through municipalities.

SUMMARY OF THE INVENTION

In one aspect the present invention provides a wastewater treatment system whereby a MWS can be used with either an SSS or an AWTS.

In another aspect, the present invention provides a wastewater/re-use treatment system which reduces pollution of streams, particularly streams in or near municipal areas.

In still another aspect of the present invention, there is provided a wastewater/re-use treatment system which reduces the load on an MWS and conserves water.

Still a further aspect of the present invention, is a wastewater/re-use treatment system which can be retrofitted to existing sources of wastewater in municipalities to reduce the load on the MWS, and conserve water.

In yet a further aspect of the present invention, there is provided a method for treating wastewater, which is environmentally friendly, reduces the load on MWS resulting in cost savings, and which can conserve the use of fresh water.

In yet another aspect of the present invention, there is provided a wastewater/re-use treatment system, which reduces the amount of potable water which must be generated to service residences, businesses, etc.

BRIEF DESCRIPTION OF THE DRAWINGS

FIG. 1 is a schematic view of a prior art wastewater disposal system using an MWS.

FIG. 2 is a schematic view of one embodiment of the present invention utilizing an SSS system.

FIG. 3 is a schematic view of another embodiment of the present invention utilizing an SSS system.

FIG. 4 is a schematic view showing another embodiment of the present invention utilizing an SSS system.

DESCRIPTION OF THE PREFERRED EMBODIMENTS

Figure 5:
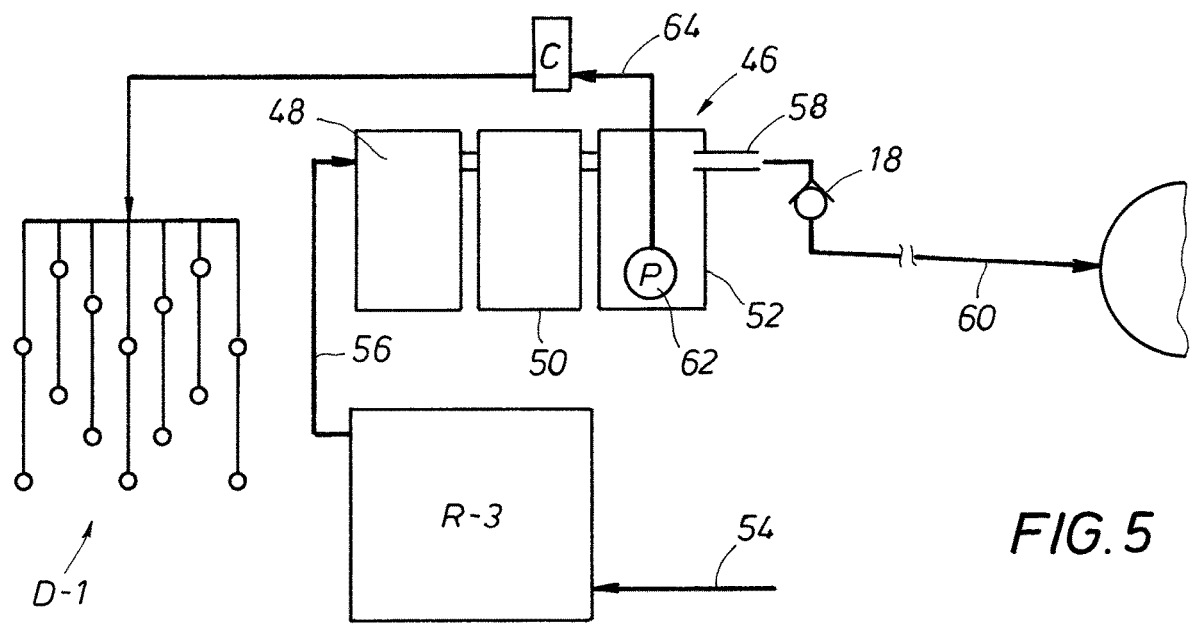
FIG. 5 is a schematic view of another embodiment of the present invention utilizing an AWTS, e.g., an ATS.

In the following description and claims, the term "irrigation system" or variants thereof include underground drip emitter irrigation systems, drain field systems, sprinkler systems, or any other system wherein the treated wastewater is used for enhancing vegetation growth. The term "municipal wastewater treatment system" or variants thereof is intended to include not only such systems run by a governmental organization but also any wastewater treatment system which is centralized in the sense that a plurality of residences or dwellings are being serviced by the central wastewater treatment system. Thus, for example the term would include such wastewater systems dedicated to a single subdivision or cluster of dwellings which could be run or controlled by the residents employing a "central wastewater treatment system." The term "central wastewater collection system" or variants thereof includes any series of piping or other collection means for transferring wastewater to a municipal wastewater treatment system (MWS) or a central wastewater treatment system. Furthermore, the term "central water supply system," "central source," or variants thereof includes not only municipal water supply systems run by governmental agencies but also potable water supply sources connected to a plurality of dwellings, e.g., a large water well servicing a plurality of houses. The term "treated wastewater use recipient" includes any place, piece of equipment, structure, or the like to which treated wastewater can be sent and, desirably, usefully employed. The term "treated wastewater" includes wastewater from which at least most solids have been removed and can also include substantially solids free wastewater which has been subjected to aerobic or other treatment as for example, treatments afforded by an ATS. It further includes wastewater which has been disinfected using any of a variety of disinfection methods. The term "selectively operable" includes a condition, circumstance or event which happens by virtue of an affirmative action by an entity or thing as well as passively by virtue of an arrangement which allows such condition, circumstance, or event to occur, usually periodically. The term "pump system" is intended to mean one or more pumps as may be desired for use in the wastewater reuse system of the present invention.

Referring first to FIG. 1, there is shown the prior art system, presently in widespread use, for the treatment of wastewater by an MWS. Fresh water from a suitable central source, e.g., a municipal water supply, enters residence R via line 10 and is used in a typical manner for bathing, toilets, dishwashing, clothes washing, etc., the used wastewater being discharged from residence R through line 12 forming part of a central wastewater collection system and ultimately to an MWS. The treated wastewater from the MWS is typically discharged to a stream 15 or other body of water via line 16. In some instances a check valve 18 is used to prevent back-up of wastewater from line 12 downstream of check valve 18 into residence R. As can be seen from FIG. 1, all of the fresh water to residence R via line 10 ends up in the MWS, and is not reused.

Referring now to FIG. 2, there is shown one embodiment of the present invention employing the use of an SSS shown generally as 17. Fresh water enters residence R-1 via line 20 from a central source and again is used in the conventional manner as described above with respect to FIG. 1, the discharged wastewater flowing via line 22 to the pretreatment/settling tank 24 of the SSS 17, clarified water from the pretreatment tank 24 passing to pump or holding tank 26 from which it is discharged using a pump 28 through line 29 to the manifold 30 of an irrigation system shown generally as D, comprised of a manifold 30 connected to a series of emitter pipes 32 having emitters 34 to irrigate the property on which residence R-1 is located, an adjacent greenbelt, etc.

In the event of an upset in the SSS which causes excessive amounts of clarified water to be in tank 26, an overflow line 36 from tank 26 permits the excess wastewater from the SSS to flow into line 40 which is connected to the MWS, the treated wastewater from the MWS being discharged to stream 42 via line 44.

The system shown in FIG. 2 represents one of the simpler versions of the present invention in which the relative elevation or grade between the pump tank 26 and line 40 is such that gravity flow out of pump tank 26 can be employed, i.e., there is no necessity to pump the water from pump tank 16 into line 26. This condition is depicted by the downward slant of line 40 relative to overflow line 36. However, as will be seen hereinafter, in cases where, because of elevation or for other reasons, gravity flow is not desirable, pump tank 26 can contain a pump which can pump the water, in a selectively operable manner, into line 40 out of pump tank 26.

As will be seen hereinafter, in addition to upsets in the SSS, excessive rain may have saturated the ground in which the irrigation system D is located, meaning no water is needed for irrigation. Accordingly, the excess water is again diverted to the MWS in connection with another embodiment described hereafter.

It will be noted that unlike the system shown in FIG. 1, in the system shown in FIG. 2, unless there is an upset, unusual usage or excessive rain, the fresh water entering residence R-1 through line 20 is ultimately used for irrigation purposes on the property of the residence R-1. Not only does this reduce the load on the MWS, it conserves fresh water, since absent the drain field or irrigation system D, all of the fresh water entering R-1 would flow to the MWS. Accordingly, the system shown in FIG. 2 both lowers the load on the MWS and conserves fresh or potable water from the municipal source.

Referring now to FIG. 3, there is shown a modification of the system shown in FIG. 2. The embodiment shown in FIG. 3 differs from that shown in FIG. 2 in that instead of the wastewater from pump tank 26 being pumped to irrigation system D, a portion can be recycled via line 70 and valve 72 to residence R-1 for reuse in the flushing of toilets of both the tank and tankless type. It will be appreciated that when recycle of treated wastewater is used in the manner described in FIG. 3, it would generally be desired that there be a pressure tank to which line 70 is connected, such tanks being well known in the use of water wells, and serving to supply sufficient pressure to flush the toilets. Further, in the embodiment shown in FIG. 3, the use of a disinfection station C would be particularly desirable since even though the water is not being consumed, i.e., is not potable, since it is entering residence R-1, disinfecting of the wastewater is desirable, if not mandatory.

FIG. 3 illustrates how the present invention makes maximum reuse of treated wastewater from a dwelling or residence R-1. In this regard, not only is the wastewater used for irrigation purposes, but it can, optionally, be recycled for flushing toilets in residence R-1. This further decreases the need for potable water to be supplied from the municipal source via line 20 and decreases the load on the NWS, thereby conserving natural resources and reducing environmental problems.

Referring now to FIG. 4, there is shown yet another embodiment of the present invention. The embodiment shown in FIG. 4 is similar to that shown in FIG. 3 in that the present invention is exemplified by the use of an SSS system 17. However, in the embodiment shown in FIG. 4, there is a float switch assembly 80 disposed in pump tank 26. Float switch assembly 80 is connected to a controller 82. The embodiment shown in FIG. 4 differs from that shown in the embodiment depicted in FIG. 3 also in the fact that the relative elevations between line 40 and the pump tank 26 is such that gravity flow will not allow water from pump tank 26 to flow into line 40. This is depicted by the upward slop of line 40 in FIG. 4 as compared to the downward slope of line 40 shown in FIG. 3. In the embodiment shown in FIG. 4, pump 28 serves a dual purpose. In one respect, pump 28 is used in the manner shown in the embodiments in FIGS. 2 and 3 in that it pumps water from pump tank 26 to the irrigation system D. However, pump 28 because of the elevation difference noted above with respect to FIG. 4, pumps water out of pump 26 into line 40. These dual functions are accomplished by the use of float assembly 80, and a first solenoid valve 84 in line 29 and a second solenoid valve 86 in line 40. When it is desired to pump water into irrigation system D, control box 82 will maintain solenoid valve 86 in a closed position while solenoid valve 84 is open. Accordingly, when pump 28 comes on, water will be pumped in the manner described with respect to the embodiment shown in FIG. 3 to the irrigation system D and also, if desired, and as shown in FIG. 3, for reuse in residence R-1. In the case where no water is necessary to satisfy irrigation system D, and in the case where the wastewater level in pump tank 26 reaches a certain level, float switch assembly 80 will signal controller 82 to open solenoid valve 86 while maintaining solenoid valve 84 closed and pump 28 will now pump water from tank 26 through valve 86 and check valve 18 in the central disposal line 40. In this scenario, once the water level in pump tank 26 decreases to the desired level, float switch assembly 80 will then signal controller 82 which in turn will shut solenoid valve 86. It will be recognized that while in the embodiment shown in FIG. 4, and other embodiments, a single pump 28 serves both the purpose of pumping the wastewater for reuse purposes but also into the central disposal line, dual pumps forming part of a pump system could be employed, one being dedicated to reuse functions, e.g., irrigation system D, the other being dedicated to pumping excessive wastewater in pump tank 26 into central disposal line 40.

Referring now to FIG. 5, there is shown another embodiment of the present invention employing an AWTS shown generally as 46. The AWTS 46 shown in FIG. 5 is of the ATS type although it will be recognized that other advanced wastewater treatment systems can be employed. Fresh water enters residence R-3 via line 54 and is used in residence R-3 for purposes described above, the wastewater being discharged via line 56 into the settling/pretreatment tank 48 of the AWTS 46, clarified water from settling tank 48 flowing into aerobic/clarifier tank 50, clarified, aerobically treated wastewater flowing from aerobic/clarifier treatment tank 50 to pump tank 52.

Water from pump tank 52 can flow via an overflow 58 into the central disposal line 60 which is connected to an NWS as described above. As discussed with respect to the embodiment shown in FIG. 2, a pump 62 disposed in pump tank 52 discharges treated wastewater via line 64 to an irrigation system D-1 comprising the same elements described above with respect to the embodiment shown in FIG. 2. As can be seen in FIG. 5, the water discharged through line 64 to the irrigation system D-1 flows through a disinfection station shown generally as C, which can be of various types including chlorinators, UV treatments systems, etc. While as shown in FIG. 5, the wastewater in line 64 flows through the disinfection station, this is for illustrative purposes only. There are many known types of disinfection methods and apparatuses for disinfecting wastewater. For example, the disinfecting apparatus C can comprise a chlorinator which adds chlorine to line 64. Further, the disinfecting apparatus C can comprise an ultraviolet irradiation system through which the treated wastewater flows before being discharged to the irrigation system D-1. Thus, disinfection station C is intended to show that the wastewater can be disinfected in some well known manner.

Figure 6:
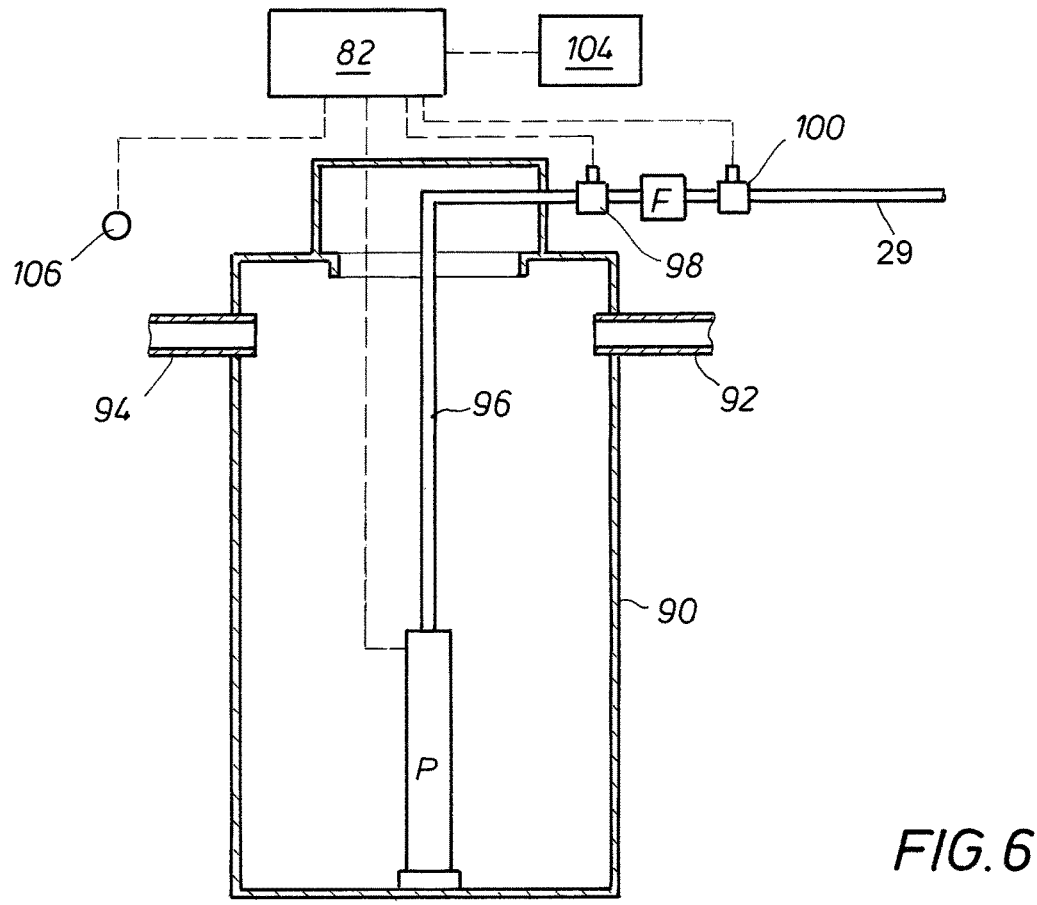
FIG. 6 is an elevational view showing another embodiment of the present invention.

Referring now to FIG. 6 there is shown a typical pump tank 90 having an outlet 92 and an inlet 94 from either an aerobic/clarifier tank in the case of an ATS or from the pretreatment tank in the case of an SSS. Disposed in pump tank 90 is pump P which has a pump outlet line 96, line 96 conveying water through filter F into line 29 and alternatively to irrigation system D (see FIG. 3), i.e., for reuse purposes. Discharge line 26 is connected to a pressure sensor 98 disposed upstream of filter F and also to a pressure sensor 100 disposed downstream of filter F. The use of filter F is generally necessary when the use recipient is an irrigation system with drip emitters. As is known to those skilled in the art, drip emitters have relatively small openings and can easily plug from solids being pumped from the pump tank if they are not filtered out. Pressure sensor 98 is designed to detect an excessively high pressure indicating that filter F is plugged. In this regard, pressure switch 98 is connected to controller 82 for purposes described hereafter. Pressure switch 100 is also connected to controller 82 and serves the purpose of detecting the pressure in the irrigation system D to which line 29 is connected. In this regard, if the pressure is too high, it can indicate that the irrigation system is plugged. Conversely, if the pressure is too low, it could indicate a leak in the system. In either event, it would show that the irrigation system requires servicing. As noted above, pressure sensors 98 and 100 are connected to controller 82. Controller 82 is connected to a monitoring system 104 discussed more fully below. In the event that pressure sensors 98 and 100 sense undesirable pressure(s), a signal would be sent to controller 82 which in turn would be sent to monitor 104. Monitor 104, as discussed below, is of a type which could be accessed by the homeowner, various regulatory agencies, maintenance companies, etc. to determine not only where a malfunction in the system is located, but the exact nature of the malfunction. Thus, pressures outside of acceptable ranges experienced by either pressure sensor 98 or 100 would be transmitted virtually in real time to one or more entities for evaluation and, if needed, corrective action.

As noted, line 29 goes to an irrigation system such as D-1 shown in FIG. 5. It is customary in irrigation systems comprised of drip pipes to have a moisture sensor in the ground area irrigated by the irrigation system. Such a moisture sensor is indicated in FIG. 6 at 106 and would be disposed for example in the ground area irrigated by irrigation system D-1. Moisture sensor 106 is also connected to controller 82. When moisture sensor 106 signals insufficient moisture in the ground, controller 82 will activate pump P to send water via line 29 to irrigation system D-1. Conversely, once the moisture sensor 106 signals to controller 82 that the moisture level in the ground is sufficient, controller 82 will then deactivate pump P and cease flow of water in irrigation system D-1.

It will be understood that the controller can include a timer which controls on/off cycles of the pump in a predetermined manner as well as performing functions described above.

In the case of a low level float/sensor in the pump tank, the float is operatively connected to the pump P, and if the float indicates insufficient water level in the pump tank, the pump P will not come on regardless of the action of the timer to thereby prevent the pump from overheating. Additionally, with a moisture sensor, if the ground is too wet; e.g., from heavy rain, the sensor 106, operatively connected to the pump P, will not allow the pump P to come on, again regardless of what the timer does. Accordingly, in the case where the low level float assembly 80 shows excess water in pump tank 26 which needs to be removed, and assuming a timer has the pump set for predetermine run cycles, the timer will be overridden whereby pump P can discharge water from the pump tank 26 either into the central drain line 40 or to the irrigation system D. Likewise, if the moisture sensor 106 indicates insufficient moisture level, controller 82 will again signal pump P to send water to the irrigation system D as described above. Again, it may be necessary to override the predetermined cycles of the timer. Furthermore, if there is water demand from irrigation system D but insufficient water in the pump tank for the pump P to run without overheating, the controller 82 will again override the timer.

In addition to the above components, the systems could have a solids level detector in the pretreatment tank, such that if the solids level is too high, the solids level detector, operatively connected to the pump, would prevent the pump from coming on, lest inadequately clarified water from the pretreatment tank flows into the pump tank and be pumped into the irrigation system.

Another optional component in the system could be a current sensor on the pump to determine if the pump is correctly working. Yet still, in lieu of a current sensor, there could be a pump counter which indicates how many cycles and the length of each cycle the pump has been on over some fixed period of time; e.g., 24 hours. In other words, the pump counter, and in the alternative, the current sensor, would indicate proper functioning of the pump.

It will also be understood that in the systems, particularly an ATS, there are various gauges, controls, floats, sensors, etc., which are used in the ordinary manner of operation of the ATS system.

As noted, a desirable optional feature of the systems is a monitoring system, to which any or all of the sensors, floats, timers, etc. could be connected, the monitoring system being of the type which would signal in a suitable manner, that one or more problems is being experienced in the system, and which requires attention. Such a monitoring system could be on a panel board or the like at the residence or, in a more sophisticated system, at some centralized, monitoring site, which could be accessed by the homeowner, various regulatory agencies, maintenance companies, etc., to determine not only where a malfunctioning system is located, but the exact nature of the malfunction.

Particularly desirable monitoring systems are disclosed and/or claimed in one of the following: U.S. Pat. Nos. 7,149,701; 7,525,420; U.S. Patent Publications 2005/0021359; 2004/0230455; 2007/0021971; 2007/0106525; and 2007/0106527, all of which are incorporated herein by reference.

The choice of whether to use an SSS or an advanced wastewater treatment system; e.g., an ATS, in the present invention depends on a number of factors such as the exact location of the residence, type of soil involved, expense, etc. For example, in certain municipal areas, SSS systems would not be acceptable, whereas AWTS systems would be acceptable. Additionally, the type of soil may determine the type of system to use. If the soil on which the system is to be placed is sandy, loamy, or otherwise porous, an SSS system could work. However, in rocky or hard terrain, the preferred system would be an AWTS. Furthermore, if there is a danger of contamination of underground aquafiers, an AWTS system would also be the choice of preference. In this regard, it should be noted that disinfectant systems typically form part of AWTS, but are typically not used with SSS.

As noted regardless of whether an SSS or an AWTS is used, and absent discharge of the treated wastewater to a stream, which is not desirable, there should be sufficient area; e.g., yards, vegetation, greenbelts or the like, that can handle the treated wastewater without the buildup of organic material in the drain field. In systems using only a SSS or AWTS with no connection to a MWS, this can occur. The present invention solves the latter problem since, even if the drain field or irrigation area is too small, once the moisture sensor signals to controller 82 that there is sufficient moisture in the ground, the excess treated wastewater can be sent to the MWS.

As discussed above, at least a portion of the treated wastewater can be returned to a residence, commercial establishment, etc. for use in the flushing of toilets. In this regard, some of the treated wastewater could be pumped to a pressure tank, commonly used with water wells, which maintained adequate line pressure for toilet flushing. In this case, it may be desirable or necessary, particularly if a tank type toilet is employed is used, to disinfect the water being used for this purpose prior to recycle to the residence. However, as is well known, particularly in commercial establishments, many bathrooms are equipped with tankless toilets and, accordingly, little if any disinfectant may be required.

In recycling for flushing purposes, if feasible and desired, the treated wastewater could be disinfected and recycled, filtered and recycled, filtered, disinfected and recycled, filtered, disinfected and then introduced into a pressure tank which would maintain line pressure to the residence for flushing purposes.

The addition of recycle for flushing purposes would further minimize the amount of wastewater being discharged to the MWS. Furthermore, in a typical residence, the greatest use of potable water is in the flushing of toilets. Accordingly, recycle of the treated wastewater for this purpose would further reduce the use of potable water being used by the residence.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A wastewater reuse system operatively connectable to a dwelling for humans, said dwelling being located at a site, said reuse system comprising:
    a pretreatment tank connectable to said dwelling to receive black water comprising human waste solids from said dwelling and allowing settling of said solids in said black water to produce an at least partially clarified black water;
    a holding tank displaced from said pretreatment tank for receiving said at least partially clarified black water from said pretreatment tank;
    a transfer line from said holding tank, said transfer line being operable to be connected to a sewage line forming part of a central wastewater treatment system;
    a drip irrigation system on said site, said drip irrigation system being the sole method of disposing of said partially clarified black water on site, there being no aerobic wastewater treatment used; and
    a pump connected to said holding tank and selectively operable for pumping said at least partially clarified black water from said holding tank to said drip irrigation system.

2. The wastewater reuse system of claim 1, wherein there is a filter between said pump and said drip irrigation system.

3. The wastewater reuse system of claim 1, wherein said transfer line comprises a gravity flow line.

4. The wastewater reuse system of claim 1, wherein said pretreatment tank is free of any filter media.

\* \* \* \* \*